(12) United States Patent
Jang

(10) Patent No.: US 8,213,490 B2
(45) Date of Patent: Jul. 3, 2012

(54) TRANSCEIVER SYSTEM AND ASSOCIATED METHODS AND SYSTEMS

(75) Inventor: Young-chan Jang, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 962 days.

(21) Appl. No.: 12/216,557

(22) Filed: Jul. 8, 2008

(65) Prior Publication Data

US 2009/0110040 A1 Apr. 30, 2009

(30) Foreign Application Priority Data

Oct. 30, 2007 (KR) .................. 10-2007-0109699

(51) Int. Cl.
*H04B 3/46* (2006.01)
*H04B 17/00* (2006.01)
*H04Q 1/20* (2006.01)

(52) U.S. Cl. ........ 375/224; 375/228; 375/231; 375/371; 702/107

(58) Field of Classification Search .................. 375/224, 375/228, 231, 371; 702/107
See application file for complete search history.

(56) References Cited

U.S. PATENT DOCUMENTS

| 5,003,555 | A | 3/1991 | Bergmans |
| 6,493,394 | B2 | 12/2002 | Tamura et al. |
| 6,708,248 | B1 | 3/2004 | Garrett, Jr. et al. |
| 6,747,474 | B2 | 6/2004 | Borkar et al. |
| 7,626,451 | B2 * | 12/2009 | Kirn .............................. 329/312 |
| 7,970,567 | B2 * | 6/2011 | Horan et al. ................... 702/107 |
| 2005/0135519 | A1 | 6/2005 | Lee |
| 2005/0265440 | A1 | 12/2005 | Sohn |
| 2006/0071687 | A1 | 4/2006 | Kim |
| 2007/0104265 | A1 | 5/2007 | Lin et al. |

OTHER PUBLICATIONS

Dally, William, J. et al., "Transmitter Equalization for 4-GBPS Signaling" IEEE Micro, Jan./Feb. 1997, pp. 48-56.
Sidiropoulos, Stefanos et al., "A 700-Mb/s/pin CMOS Signaling Interface Using Current Integrating ReceivetS"·IEEE Journal of Solid-State Circuits. vol. 32, No. 5, May 1997, pp. 681-690.
Sohn, Young-Soo et al., "A 1.35 Gbps Decision Feedback Equalizing Receiver for the SSTL SDRAM Interface with 2X Over-sampling Phase Detector for Skew Compensation between Clock and Data" ESSCIRC, 2000, pp. 787-790.

* cited by examiner

*Primary Examiner* — Phuong Phu
(74) *Attorney, Agent, or Firm* — Harness, Dickey & Pierce, P.L.C.

(57) ABSTRACT

In the example embodiments, test signals sent from a transmitting system are received at a receiving system. The receiving system generates a determination signal indicating, in one embodiment, whether received signals have a desired relationship with respect to a clock signal at the receiving system. Timing of the clock signal or timing for transmitting signals may be adjusted based on the determination. In another embodiment, the receiving system generates a determination signal indicating whether the pulse width of a lone pulse signal equals a desired time interval. Equalization or pre-emphasis is controlled based on the determination signal.

23 Claims, 17 Drawing Sheets

TRANSCEIVER SYSTEM AND ASSOCIATED METHODS AND SYSTEMS

FOREIGN PRIORITY INFORMATION

The subject application claims priority under 35 U.S.C. 119 on Korean application no. 10-2007-0109699 filed Oct. 30, 2007; the contents of which are hereby incorporated by reference in their entirety.

BACKGROUND

The demand for high data rate transmission continues to increase. As a result, data signals are being transmitted at very high data rates such as in the gigabit per second range. Such high data rate transmissions are subject to significant levels of distortion. This makes recovering transmitted signals extremely difficult.

Inter-symbol interference (ISI) is a well-known phenomenon that deteriorates signal integrity by reducing the timing and voltage margin of received signals. Inter-symbol interference is generally caused by limitations in the channel bandwidth. To reduce inter-symbol interference on high-speed channels, many transceiver systems use well-known pre-emphasis techniques at the transmitting system or well-known equalization techniques at the receiving system.

SUMMARY

The present invention also relates to methods associated with transmission and reception of data.

In one embodiment, a method associated with reception includes receiving a lone bit signal, where the lone bit signal includes a single pulse. Whether the width of the pulse in the lone bit signal equals a desired time interval is detected, and a detection signal indicating a result of the detecting is output.

In a related embodiment, equalization at the receiver may be selectively adjusted based on the detection signal.

In one embodiment, a method associated with transmission includes receiving a detection signal indicating whether a width of a pulse of a lone bit signal equals a desired time interval. Pre-emphasis for sending signals is selectively adjusted based on the received detection signal.

In another embodiment, a method associated with transmission and reception includes detecting whether a width of a pulse of a lone bit signal received at a receiver equals a desired time interval. One of (i) pre-emphasis for sending signals to the receiver and (ii) equalization of received signals is selectively adjusted based on the detecting.

For example, with respect to these embodiments, the desired time interval may be an interval of time associated with one bit of a data processing system, or may be an interval of time associated with a minimum inter-symbol interference.

In another embodiment related to reception, a first test signal is integrated over one-half period a clock signal to produce a first integration result, and a second test signal is integrated over the one-half period of the clock signal to produce a second integration result. The first and second signals represent a same data pattern with a different phase. A determination result indicating a phase offset of received signals with respect to the clock signal is produced based on the first and second integration results.

In another method related to transmission, first and second test signals are sent to a receiver for generating a determination signal. The first and second signals represent a same data pattern with a different phase. The determination signal indicates a phase offset at the receiver of received signals with respect to a clock signal of the receiver. Timing for sending signals is selectively adjusted based on the received determination signal.

The present invention also relates to transmission systems for transmitting data and receiving systems for receiving data.

In one embodiment, a receiving system includes a receiver configured to receive a lone bit signal. The lone bit signal has a single pulse. A first integrator is configured to integrate the lone bit pulse over half a period of a clock signal to produce a first integration result. A comparator is configured to compare the first integration result to a value representing a desired integration result to produce a determination result indicating whether a pulse width of the lone bit pulse equals a desired time interval.

In one embodiment, the transmitting system includes a first transmitter configured to transmit a lone bit signal. The lone bit signal has a single pulse. A pre-emphasis controller is configured to control pre-emphasis of the first transmitter based on a received feed back signal indicating whether a pulse width of the lone bit pulse received at a receiving system equals a desired time interval.

In another receiving system embodiment, the receiving system includes a first receiver configured to a first test signal and a second receiver configured to receive a second test signal. The first and second test signals represent a same data pattern with different phase. A first integrator is configured to integrate the first test signal over one-half period a clock signal to produce a first integration result, and a second integrator is configured to integrate the second test signal over the one-half period of the clock signal to produce a second integration result. A comparator is configured to compare the first and second integration results to produce a determination result indicating a phase offset of received signals with respect to the clock signal.

In another embodiment of the transmitting system, the transmitting system includes a first transmitter configured to send a first test signal to a receiver and a second transmitter configured to send a second test signal to the receiver. The first and second signals represent a same data pattern with a different phase. A timing controller is configured to receive a determination signal indicating a phase offset at a receiver of received signals with respect to a clock signal of the receiver, and the timing controller is configured to selectively adjust timing for sending signals based on the received determination signal.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
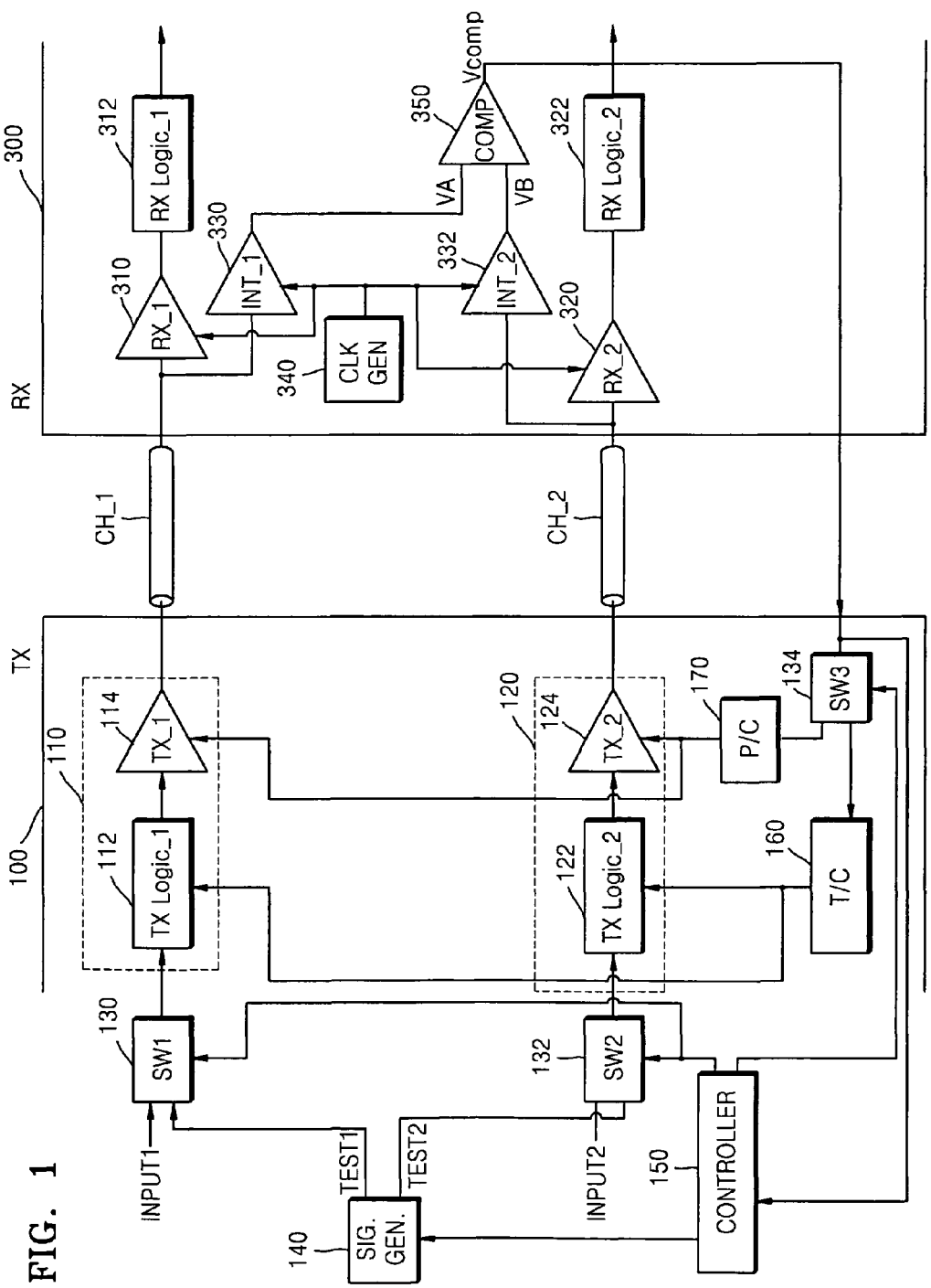
FIG. 1 illustrates a transceiver system according to an embodiment.

Example embodiments will now be described more fully with reference to the accompanying drawings. However, example embodiments may be embodied in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

It will be understood that when an element or layer is referred to as being "on", "connected to" or "coupled to" another element or layer, it may be directly on, connected or coupled to the other element or layer, or intervening elements or layers may be present. In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Thus, a first element, component, region, layer or section discussed below could be termed a second element, component, region, layer or section without departing from the teachings of the example embodiments.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a portion of transceiver system in a data processing system according to an embodiment of the present invention. As will be described in more detail below, the transceiver system may operate as an interface between two devices. As shown in FIG. 1, the transceiver system includes a transmitting system 100 and a receiving system 300 communicating over a number of channels. In the embodiment of FIG. 1, only two channels CH_1 and CH_2 are shown, but it will be understood that the transceiver system may include more or less than two channels. The channels may be transmission lines, conductive lines, fiber optic lines, portions thereof, etc.

The transmitting system 100 includes a transmitter for each channel; accordingly, in this embodiment, the transmitting system 100 includes a first transmitter 110 and a second transmitter 120 transmitting over the first and second channels CH_1 and CH_2, respectively. The first transmitter 110 includes a first transmission logic 112, which processes received data for transmission (e.g., converts digital input to an analog signal), and a first driver 114, which transmits the data over the first channel CH_1. The second transmitter 120 includes a second transmission logic 122, which processes received data for transmission (e.g., converts digital input to an analog signal), and a second driver 124, which transmits the data over the first channel CH_2. The first and second drivers 114 and 124 may also include any well-known pre-emphasis circuit for apply pre-emphasis to the transmitted signals. Because transmission logic and drivers are well-known elements, these elements and their operation will not be described in detail.

A first switch 130 supplies one of first data INPUT1 for transmission and a first test bit stream TEST1 to the first transmitter 110. A second switch 132 supplies one of second data INPUT2 for transmission and a second test bit stream TEST2 to the second transmitter 120. A signal generator 140 generates the first and second test bit streams TEST1 and TEST2. A controller 150 controls operation of the signal generator 140, and the first and second switches 130 and 132.

As shown in FIG. 1, the controller 150 also controls operation of a third switch 134. The third switch 134 supplies a feed back signal from the receiving system 300 to one of a timing controller 160 and a pre-emphasis controller 170. The timing controller 160 controls transmission timing of the first and/or second transmitter 110 and 120 by controller timing of the first and/or second control logic 112 and 122, respectively.

The pre-emphasis controller 170 may be any well-known pre-emphasis controller (e.g., combination of a counter and finite state machine) for controlling the pre-emphasis of the first and/or second drivers 114 and 124.

Operation of the transmitting system 100 will be described in detail below after the structural description of the receiving system 300.

The receiving system 300 includes a receiver and receiving logic for each channel. Accordingly, in this embodiment, the receiving system 300 includes a first receiver 310 for receiving transmission over the first channel CH_1 and a second receiver 320 for receiving transmission over the second channel CH_2. A first receiving logic 312 processes the output of the first receiver 310 (e.g., converts the received analog signal to digital), and a second receiving logic 322 processes the output of the second receiver 320 (e.g., converts the received analog signal to digital).

The receiving system 300 also includes a first integrator 330 receiving and integrating the transmission on the first channel CH_1, and the receiving system 300 includes a second integrator 332 receiving and integrating the transmission on the second channel CH_2. The first and second receivers 310 and 312, and the first and second integrators 330 and 332, operate (e.g., sample) based on a clock signal received from a clock generator 340. In one embodiment, the first and second integrators 330 and 332 integrate the received first and second test signals rTEST1 and rTEST2 over one half of the clock period. During the other half period, the first and second integrators 330 and 332 undergo an equalization operation.

A comparator 350 receives the output from both the first and second integrators 330 and 332, and generates a comparison result. This comparison result is feedback to the transmitting system 100 as the feed back signal, which is supplied to the controller 150 and is supplied by the third switch 134 to either the timing controller 160 or the pre-emphasis controller 170.

Figure 2:
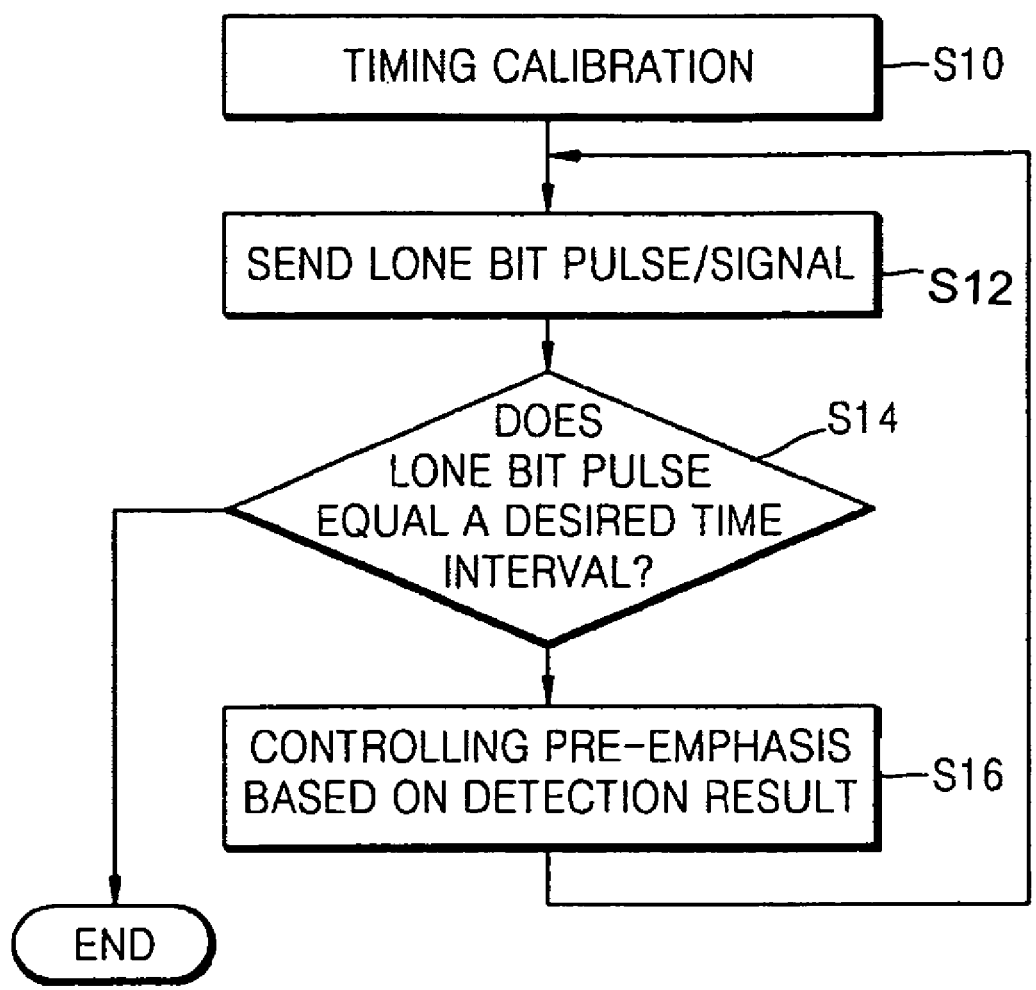
FIG. 2 illustrates a flow chart of timing and pre-emphasis calibration according to one embodiment.

Operation of the receiving system 300 and the transmitting system 100 will now be described in detail below. Before normal operation proceeds, a timing and pre-emphasis calibration between the transmitting and receiving systems 100 and 300 takes place. FIG. 2 illustrates a flow chart of the timing and pre-emphasis calibration according to one embodiment.

Figure 3:
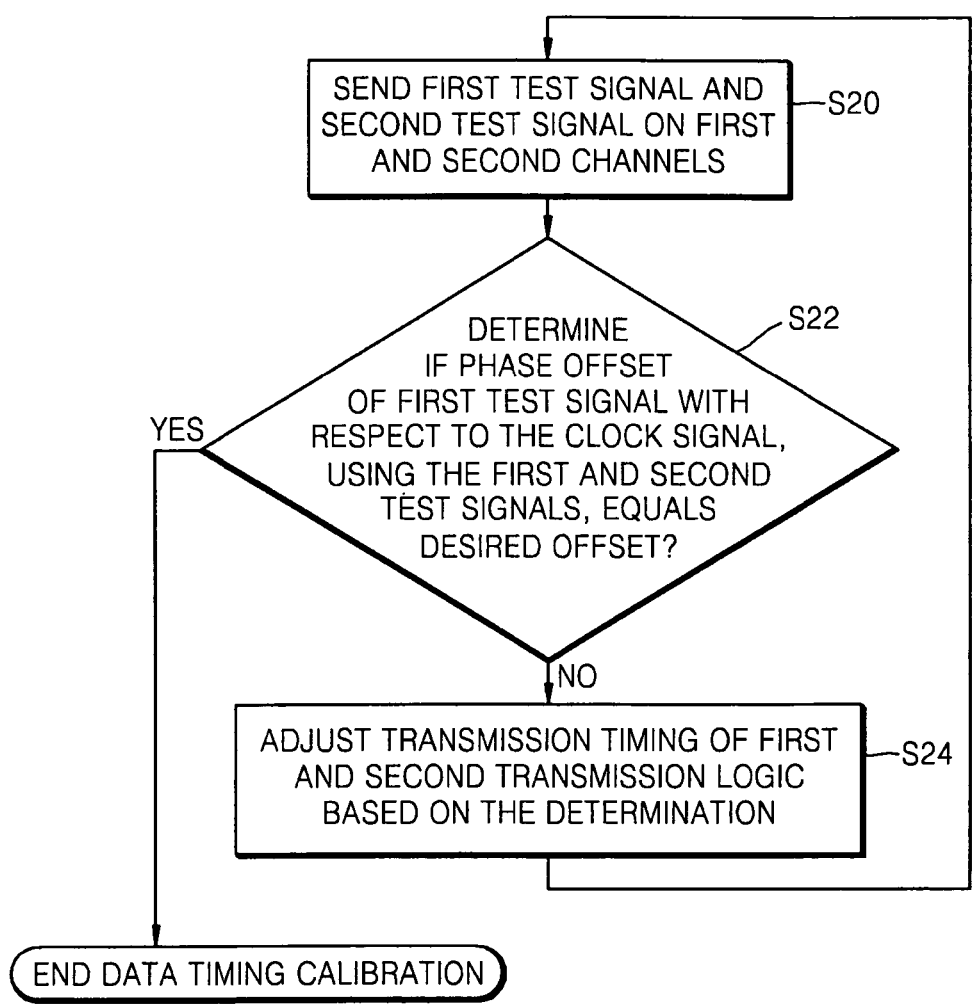
FIG. 3 illustrates a flow chart of the timing calibration process according to one embodiment.

As shown, in step S10, a timing calibration process is carried out. FIG. 3 illustrates a flow chart of the timing calibration process according to one embodiment. Referring to FIG. 3, in step S20, the controller 150 controls the signal generator 140 to generate first and second test bit streams TEST1 and TEST2, and controls the first and second switches 130 and 132 to supply the first and second test bit streams TEST1 and TEST2 to the first and second transmitters 110 and 120, respectively. In one embodiment, the first test bit stream TEST1 is "01100," and the second test bit stream TEST2 is "00110." Namely, the second test bit stream TEST2 has the same data pattern as the first test bit stream TEST1, but is phase shifted by a desired amount. Stated another way, the phase difference between the first and second test bit streams TEST1 and TEST2 is a desired amount. In one embodiment, the desired amount is one unit interval (UI), which is a time interval for one bit in the data processing system including the transceiver system of FIG. 1. Stated another way, one UI is an interval of time that is associated with producing a minimum inter-symbol interference. This will be discussed in more detail below. The first transmitter 110 converts the first test bit stream into an analog first test signal, and transmits the first test signal over the first channel CH_1. The second transmitter 120 converts the second test bit stream into an analog second test signal, and transmits the second test signal over the second channel CH_2.

Next, in step S22, the controller 150 determines if the phase offset of the first test signal received at the receiving system 300 with respect to the clock signal rCLK at the receiving system 300 equals a desired offset. In one embodiment, the desired offset is one UI.

In particular, the first and second test signals are received and integrated by the first and second integrators 330 and 332, respectively. Also, as discussed above, the first and second integrators 330 and 332 perform the integration operation in accordance with the receive clock signal rCLK. The output VA of the first integrator 330 and the output VB of the second integrator 332 are supplied to a comparator 350, which compares VA and VB to produce a comparison result Vcomp. As will be appreciated, because the first and second test signals are integrated in accordance with the receive clock signal rCLK, and because the test signals have an intended phase offset of one UI, if the received first and second test signals have the intended phase offset of one UI, then VA will equal VB. Accordingly, if VA equals VB, this confirms that the received first test signal has the desired one UI phase offset with respect to the receive clock signal rCLK.

Figure 4A:
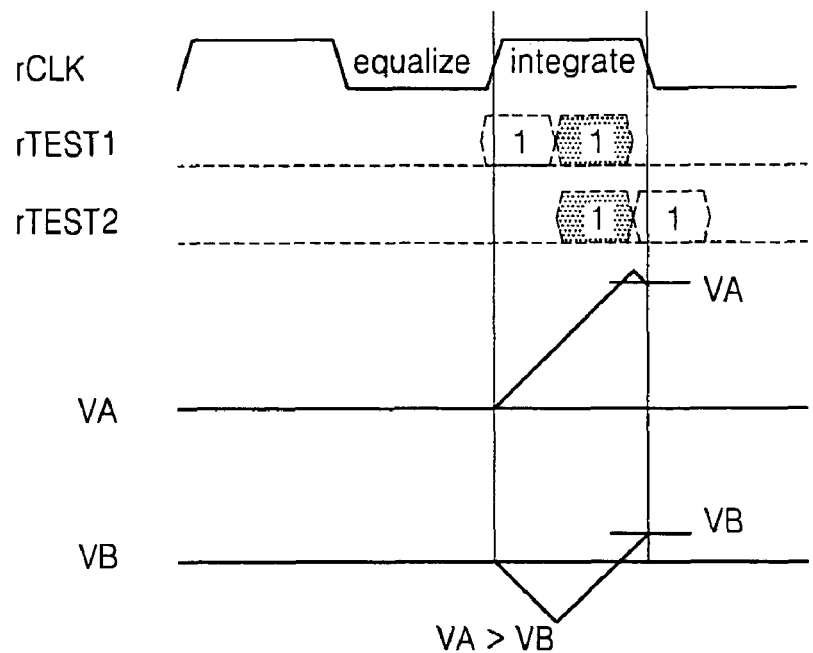
FIGS. 4A-4C illustrate example waveform diagrams for signals generated during the timing calibration of FIG. 3.

FIG. 4A illustrates an example of waveform diagrams for the received first test signal rTEST1, the received second test signal rTEST2, the output VA of the first integrator 330, the output VB of the second integrator 332 and the receive clock signal rCLK. As shown, the integrations take place during half the clock signal period. In this example, the received first test signal rTEST1 is leading the received second test signal rTEST2. As a result, VA is greater than VB, and the comparator 350 generates a comparison result Vcomp indicating VA>VB.

During the timing calibration, the controller 150 controls the third switch 134 to supply the feed back signal Vcomp to the timing controller 160. In the case of FIG. 4A, the feed back signal Vcomp indicates to the timing controller 160 that the received first test signal rTEST1 is leading the received second test signal rTEST2. As a result, the timing controller 160 in step S24 controls the timing of the first and/or second control logic 112 and 122 to eliminate and/or reduce this lead in step S24. Namely, the timing controller 160 slows the timing of the first and/or second control logic 112 and 122.

In the case of FIG. 4A, the controller 150 determines, from the feed back signal, that the phase offset of the received first test signal with respect to the receive clock signal rCLK is not equal to the desired offset (e.g., one UI). As a result, the controller 150 causes the timing calibration process to repeat starting with step S20.

Figure 4B:
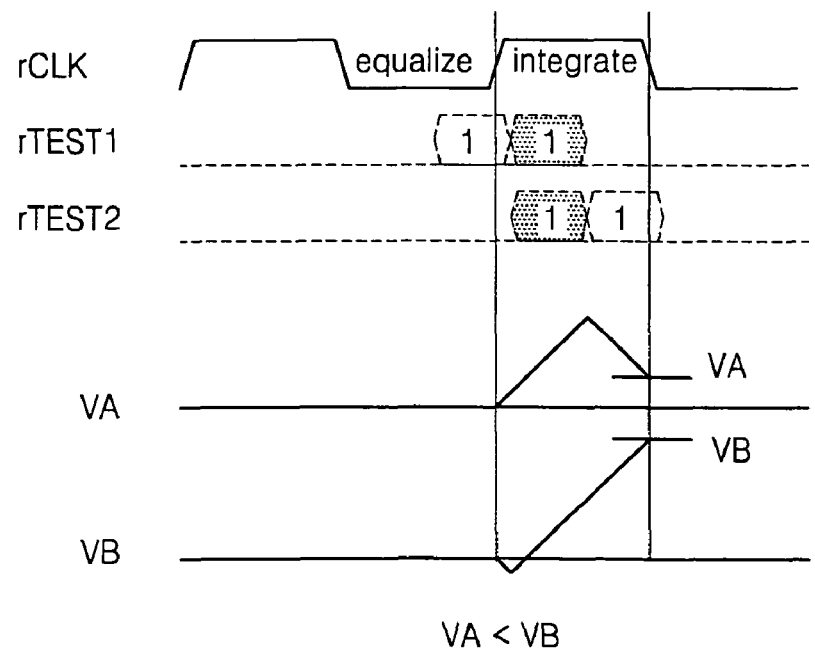

FIG. 4B illustrates another example of waveform diagrams for the received first test signal rTEST1, the received second test signal rTEST2, the output VA of the first integrator 330, the output VB of the second integrator 332 and the receive clock signal rCLK. In this example, the received first test signal rTEST1 lags the received second test signal rTEST2. As a result, VA is less than VB, and the comparator 350 generates a comparison result Vcomp indicating VA<VB.

In the case of FIG. 4B, the feed back signal Vcomp indicates to the timing controller 160 that the received first test signal rTEST1 lags the received second test signal rTEST2. As a result, the timing controller 160 in step S24 controls the timing of the first and/or second control logic 112 and 122 to eliminate and/or reduce this lag in step S24. Namely, the timing controller 160 increases the timing of the first and/or second control logic 112 and 122.

In the case of FIG. 4B, the controller 150 determines, from the feed back signal, that the phase offset of the received first test signal with respect to the receive clock signal rCLK is not equal to the desired offset (e.g., one UI). As a result, the controller 150 causes the timing calibration process to repeat starting with step S20.

Figure 4C:
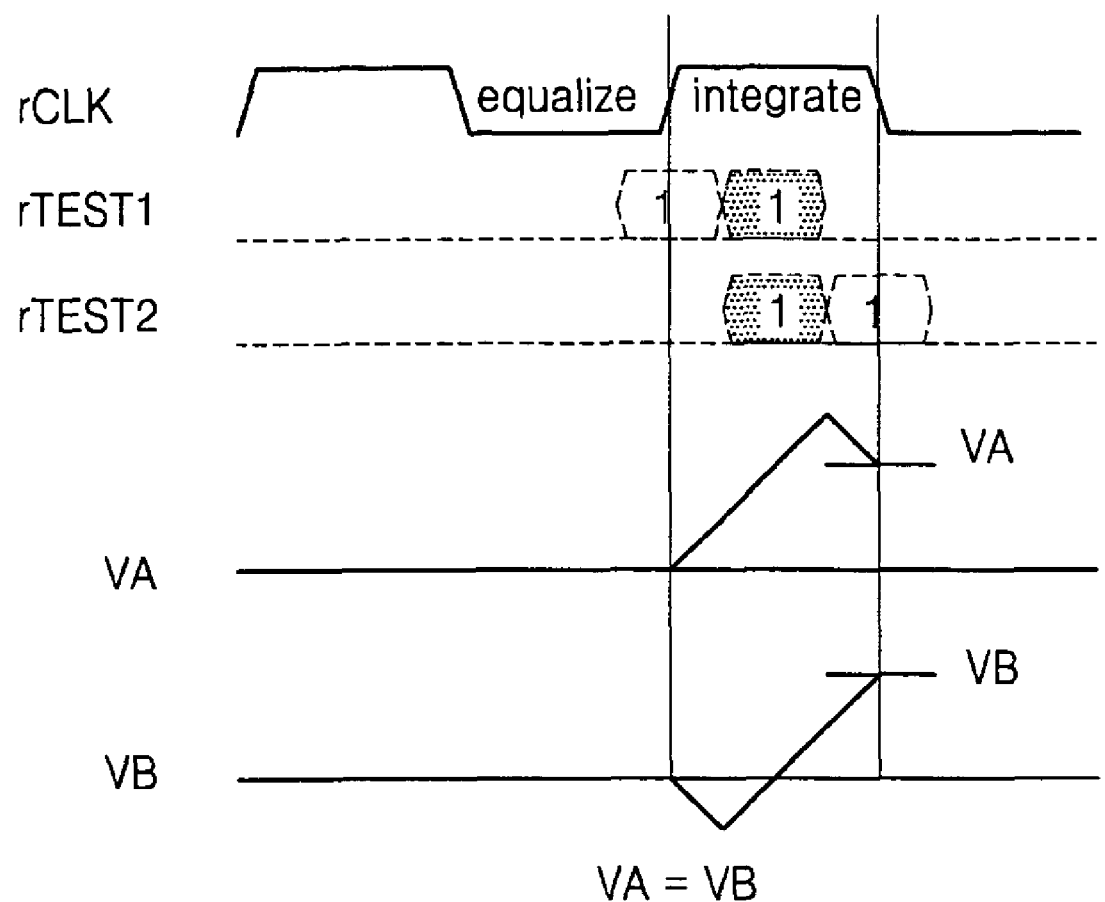

FIG. 4C illustrates yet another example of waveform diagrams for the received first test signal rTEST1, the received second test signal rTEST2, the output VA of the first integrator 330, the output VB of the second integrator 332 and the receive clock signal rCLK. In this example, the received first test signal rTEST1 is offset from the received second test signal rTEST2 by the desired time interval—one UI. As a result, VA equals VB, and the comparator 350 generates a comparison result Vcomp indicating VA=VB.

In the case of FIG. 4C, the feed back signal Vcomp indicates to the timing controller 160 that no timing control is needed. From the feed back signal, the controller 150 determines that the phase offset of the received first test signal with respect to the receive clock signal rCLK is equal to the desired offset (e.g., one UI). As a result, the controller 150 ends the timing calibration process.

Returning to FIG. 2, after the timing calibration process, the controller begins the pre-emphasis calibration process of steps S12-S16. In step S12, the controller 150 controls the signal generator 140 to generate a lone bit pulse as the first test bit stream TEST1 and to generate an alternating bit stream as the second test bit stream TEST2. For example, in one embodiment, the first test bit stream TEST1 is "00100," and the second test bit stream TEST2 is "10101." Accordingly, in step S12, the first transmitter 110 sends a lone bit pulse signal over the first channel CH_1, and the second transmitter 120 sends an alternating bit stream signal over the second channel CH_2.

Next, the controller 150 determines if the lone bit pulse in the lone bit pulse signal received by the receiving system 300 equals a desired time interval; namely, does the pulse width of the lone bit pulse equal the desired time interval. In one embodiment, the desired time interval is one UI.

In particular, the first and second test signals are received and integrated by the first and second integrators 330 and 332, respectively. Also, as discussed above, the first and second integrators 330 and 332 perform the integration operation in accordance with the receive clock signal rCLK. In particular, the first and second integrators 330 and 332 integrate over one-half a period of the receive clock signal rCLK. The output VA of the first integrator 330 and the output VB of the second integrator 332 are supplied to a comparator 350, which compares VA and VB to produce a comparison result Vcomp. As will be appreciated, the second test signal represents a signal having minimum inter-symbol interference (ISI). Accordingly, by calibrating the timing as in step S10, the one half period of the receive clock signal rCLK will equal two times the desired time interval (e.g., 2UI) such that the voltage VB will equal zero. Accordingly, if VA equals VB, this confirms that the pulse width of the received lone bit pulse in the first test signal equals the desired time interval of one UI. Stated another way, if VA=VB, this confirms that the pulse width of the lone bit pulse in the received first test signal is equal to a pulse width producing minimal ISI.

Because VB will equal zero, it will also be appreciated that this and other embodiment may be modified to supply a zero reference voltage to the comparator 350 as VB instead of supplying the output of the second integrator 332.

Figure 5A:
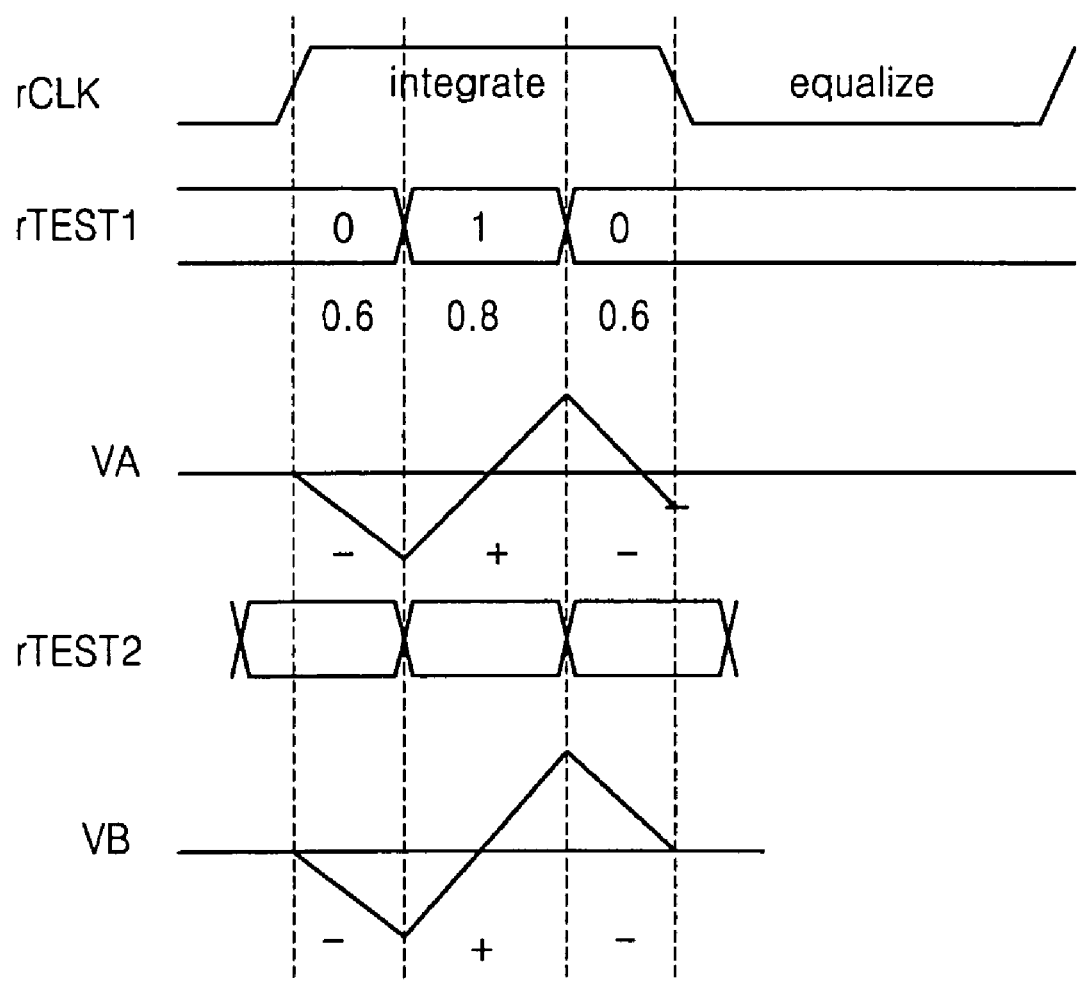
FIGS. 5A-5C illustrate example waveform diagrams for signals generated during the pre-emphasis calibration of FIG. 2.

FIG. 5A illustrates an example of waveform diagrams for the received first test signal rTEST1, the received second test signal rTEST2, the output VA of the first integrator 330, the output VB of the second integrator 332 and the receive clock signal rCLK. In this example, the lone bit pulse in the received first test signal rTEST1 is less than one UI. As a result, VA is less than VB, and the comparator 350 generates a comparison result Vcomp indicating VA<VB.

During the pre-emphasis calibration, the controller 150 controls the third switch 134 to supply the feed back signal Vcomp to the pre-emphasis controller 170. In the case of FIG. 5A, the feed back signal Vcomp indicates to the pre-emphasis controller 170 that the lone bit pulse is less than one UI. As a result, the pre-emphasis controller 170 controls the pre-emphasis of the first and/or second drivers 114 and 124 in step S16 in any well-known manner to increase pre-emphasis and enlarge the pulse width.

In the case of FIG. 5A, the controller 150 determines, from the feed back signal, that a pulse width of the lone bit pulse does not equal the desired time interval (e.g., one UI). As a result, the controller 150 causes the pre-emphasis calibration processes to repeat starting with step S12.

Figure 5B:
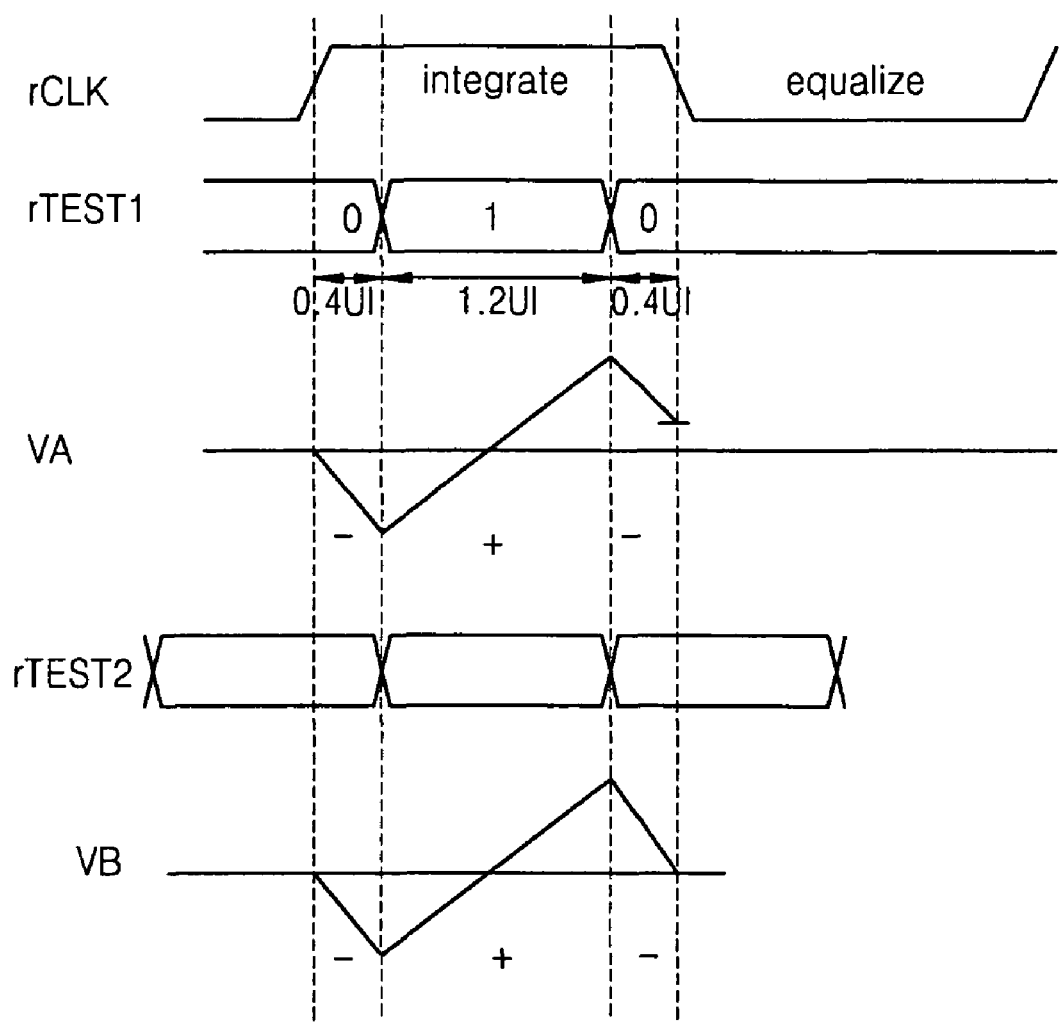

FIG. 5B illustrates another example of waveform diagrams for the received first test signal rTEST1, the received second test signal rTEST2, the output VA of the first integrator 330, the output VB of the second integrator 332 and the receive clock signal rCLK. In this example, the lone bit pulse in the received first test signal rTEST1 is greater than one UI. As a result, VA is greater than VB, and the comparator 350 generates a comparison result Vcomp indicating VA>VB.

In the case of FIG. 5B, the feed back signal Vcomp indicates to the pre-emphasis controller 170 that the lone bit pulse is greater than one UI. As a result, the pre-emphasis controller 170 controls the pre-emphasis of the first and/or second drivers 114 and 124 in step S16 in any well-known manner to decrease pre-emphasis and reduce the pulse width.

In the case of FIG. 5B, the controller 150 determines, from the feed back signal, that a pulse width of the lone bit pulse does not equal the desired time interval (e.g., one UI). As a result, the controller 150 causes the pre-emphasis calibration processes to repeat starting with step S12.

Figure 5C:
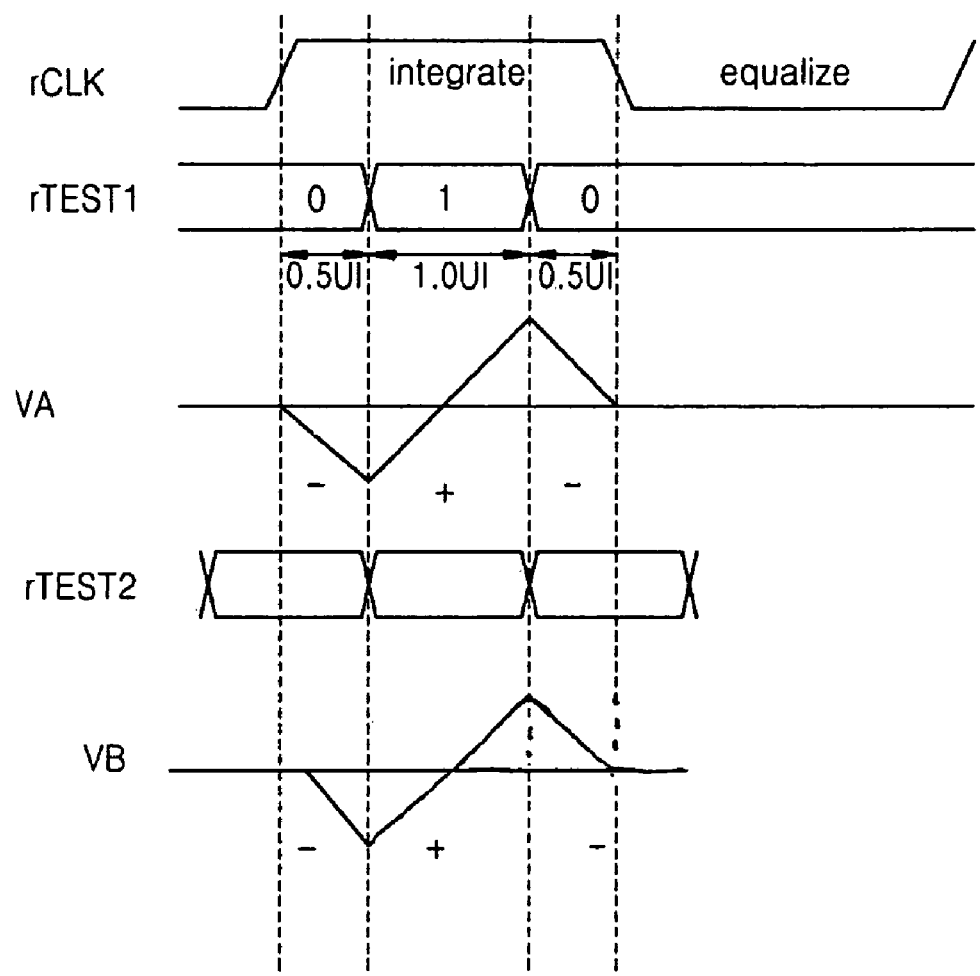

FIG. 5C illustrates another example of waveform diagrams for the received first test signal rTEST1, the received second test signal rTEST2, the output VA of the first integrator 330, the output VB of the second integrator 332 and the receive clock signal rCLK. In this example, the lone bit pulse in the received first test signal rTEST1 equals one UI. As a result, VA equals VB, and the comparator 350 generates a comparison result Vcomp indicating VA=VB.

In the case of FIG. 5C, the feed back signal Vcomp indicates to the pre-emphasis controller 170 that the lone bit pulse equals one UI. As a result, the pre-emphasis controller 170 does not change the pre-emphasis of the first and/or second drivers 114 and 124.

In the case of FIG. 5C, the controller 150 determines, from the feed back signal, that a pulse width of the lone bit pulse equals the desired time interval (e.g., one UI). As a result, the controller 150 causes the pre-emphasis calibration processes to end.

By calibrating the pre-emphasis such that the lone bit pulse equals one UI, the pre-emphasis is optimized to achieve minimal inter-symbol interference.

Once the calibration operations of FIG. 2 are complete, normal operation may take place. The controller 150 disables the third switch 134 from sending feed back to the timing and pre-emphasis controllers 160 and 170 such that no further timing and pre-emphasis changes occur. Furthermore, the controller 150 controls the first and second switches 130 and 132 to output the input data INPUT1 and INPUT2 to the first and second transmitters 110 and 120, respectively, for transmission.

Figure 6:
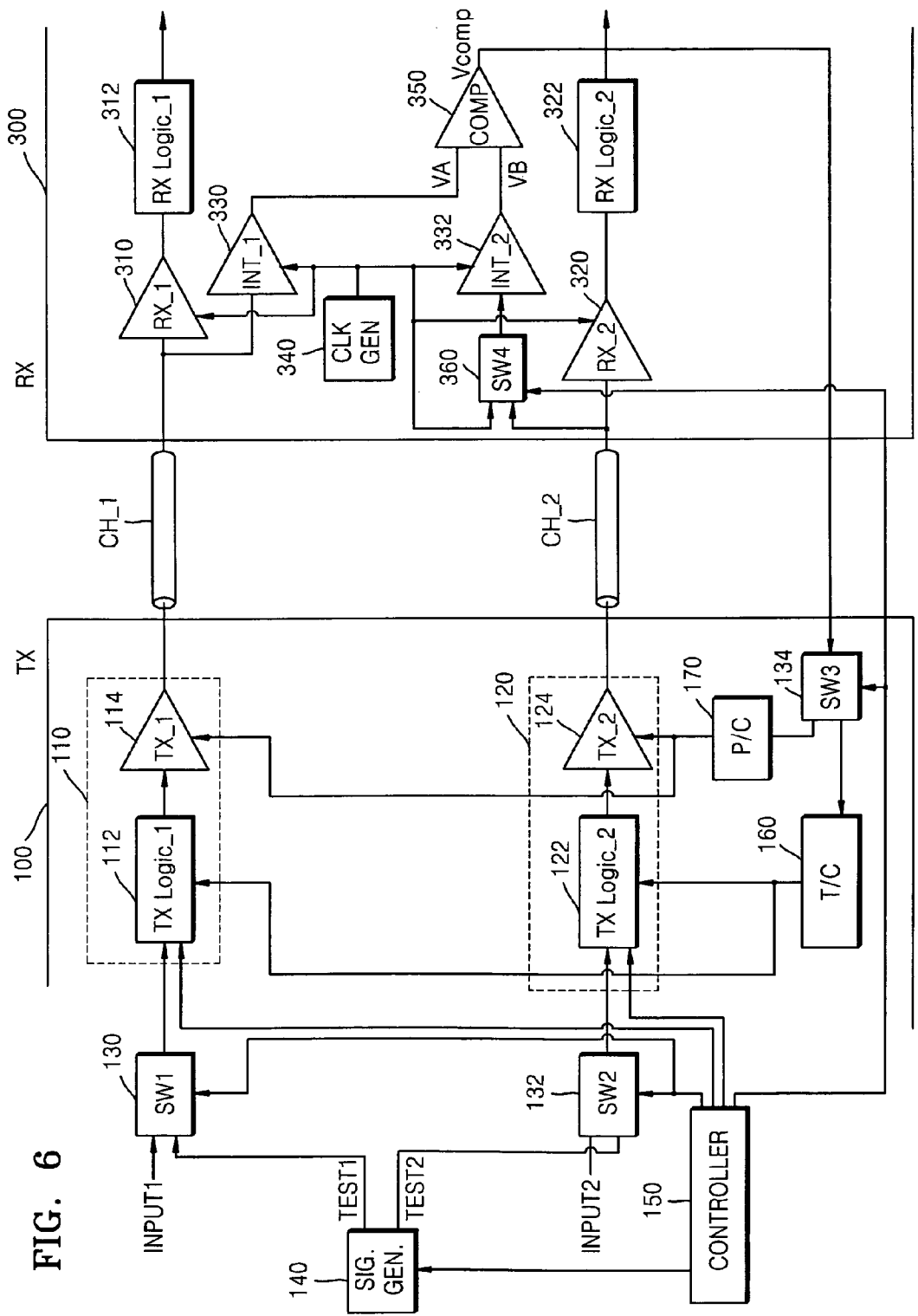
FIG. 6 illustrates a portion of transceiver system according to another embodiment.

FIG. 6 illustrates a portion of a transceiver system according to another embodiment. The embodiment of FIG. 6 is the same as the embodiment of FIG. 1 except that a fourth switch 360 selectively supplies one of the receive clock signal rCLK and a signal received on the second channel CH_2 to the second integrator 332. The fourth switch 360 performs the selection under the control of the controller 150.

In this embodiment, the controller 150 controls the fourth switch to output the received second test signal rTEST2 during the timing calibration of step S10 in FIG. 2. However, during the pre-emphasis calibration of steps S12-S16, the controller 150 controls the fourth switch to output the receive clock signal rCLK to the second integrator 332. As will be appreciated from the discussion above, the second test bit stream TEST2 having the alternating bit stream is analogous to a clock signal. Accordingly, supplying the receive clock signal rCLK to the second integrator 332 results in the same operation as discussed above with respect to steps S12-S16. Furthermore, the controller 150 may, in this embodiment, disable operation of the second transmitter 120 during the calibration process of steps S12-S16.

Figure 7:
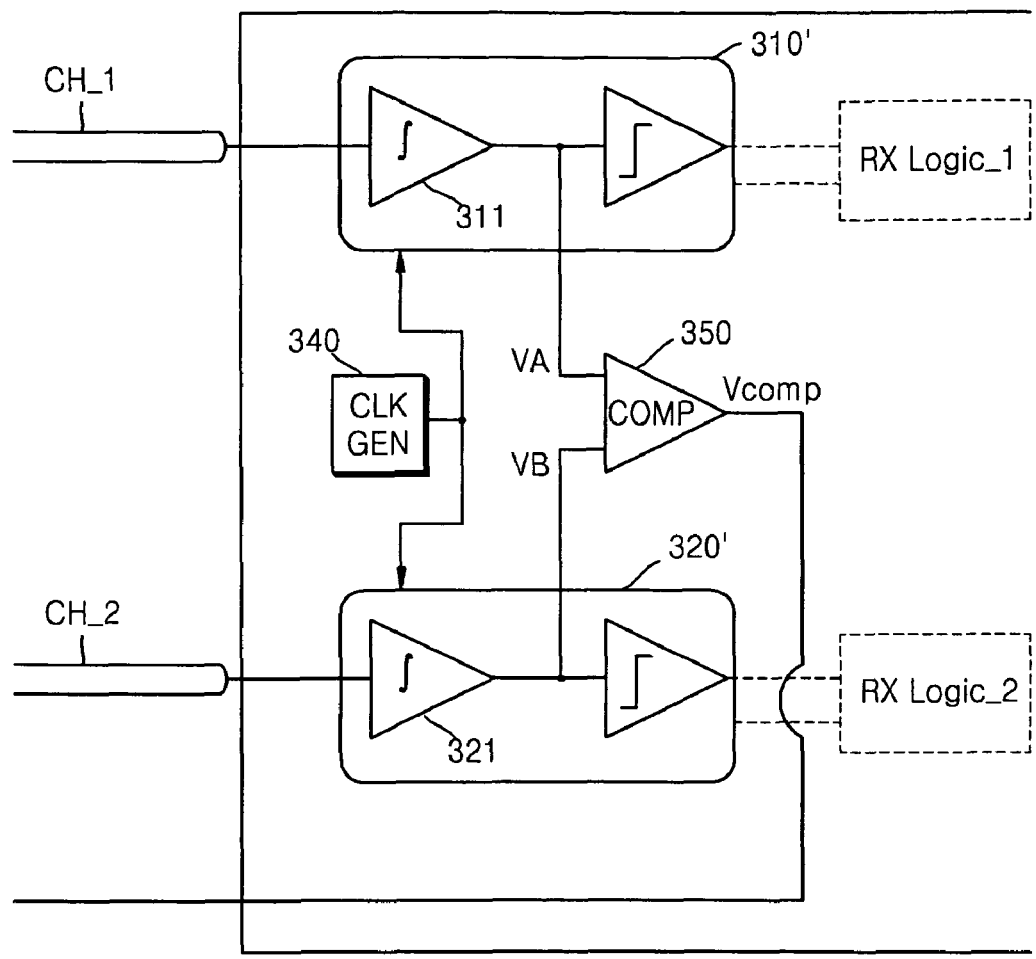
FIG. 7 illustrates a portion of the receiving system according to another embodiment.

FIG. 7 illustrates a portion of the receiving system according to another embodiment. The embodiment of the receiving system in FIG. 7 is the same as the embodiment of FIG. 1 except that the sampling receivers 310 and 320 of FIG. 1 have been replaced by integrating receivers 310' and 320'. Integrating receivers are well-known, and as shown, include an integrator. Accordingly, the output of the integrators 311 and 321 in the integrating receivers 310' and 320' may be supplied as VA and VB, respectively to the comparator 350. Otherwise, the operation of this embodiment is the same as that of FIG. 1.

Figure 8:
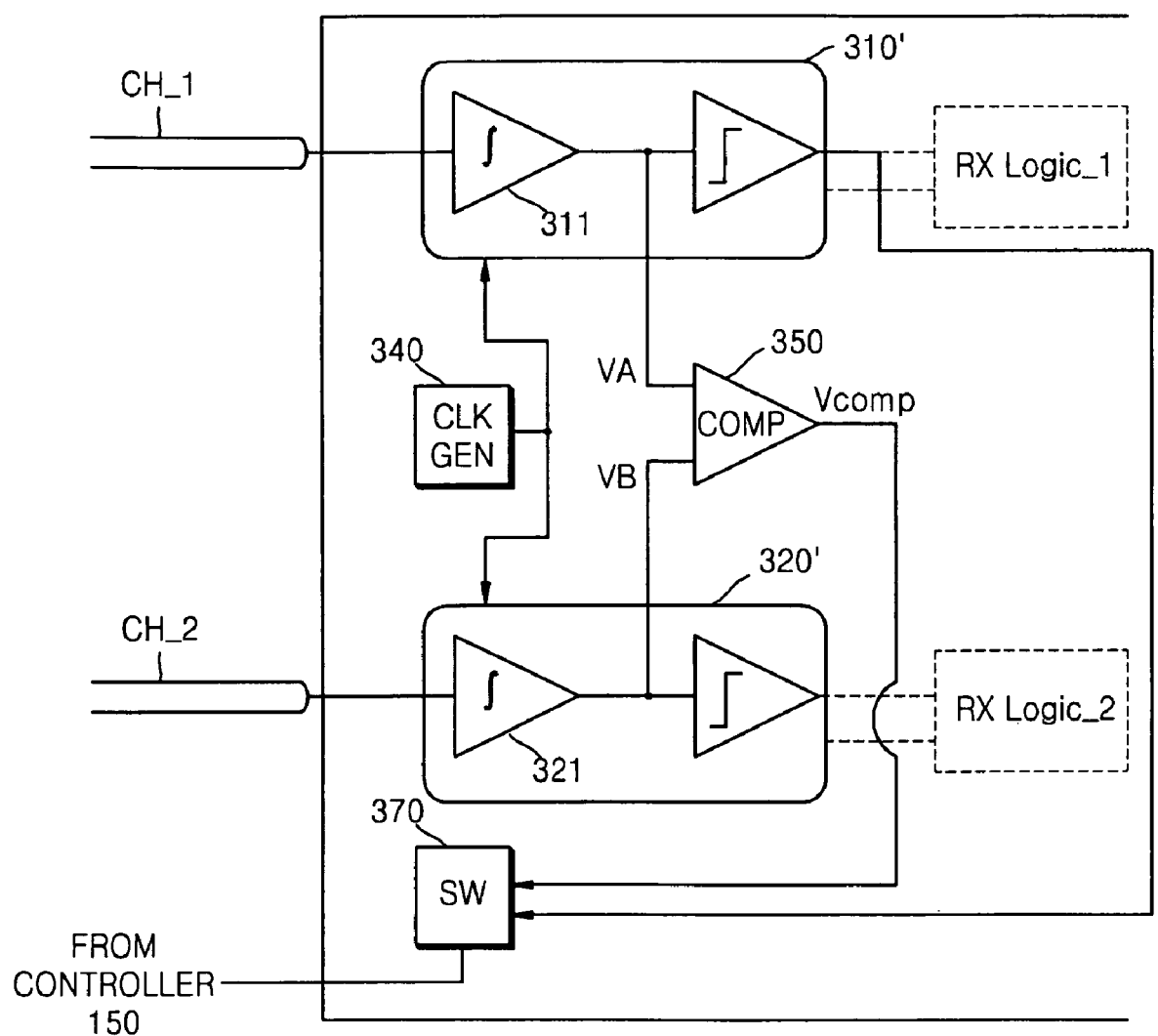
FIG. 8 illustrates a portion of the receiving system according to a further embodiment.

FIG. 8 illustrates a portion of the receiving system according to another embodiment. The embodiment of the receiving system in FIG. 8 is the same as the embodiment of FIG. 7 except that the output of the first integrating receiver 310' is supplied to a switch 370 along with the output of the comparator 350. The switch 370 selectively outputs one of the output from the integrating receiver 310' and the output of the comparator 350 as the feed back signal under the control of the controller 150. During the timing calibration of step S10, the controller 150 controls the switch 370 to output the output from the comparator 350. During the pre-emphasis calibration, the controller 150 controls the switch 370 to output the output from the integrating receiver 310'. As will be appreciated, during pre-emphasis calibration, VB is zero such that the output of integrating receiver 310' alone may suffice as the feed back signal. Otherwise, the operation of this embodiment is the same as described for the embodiment of FIG. 1.

Figure 9:
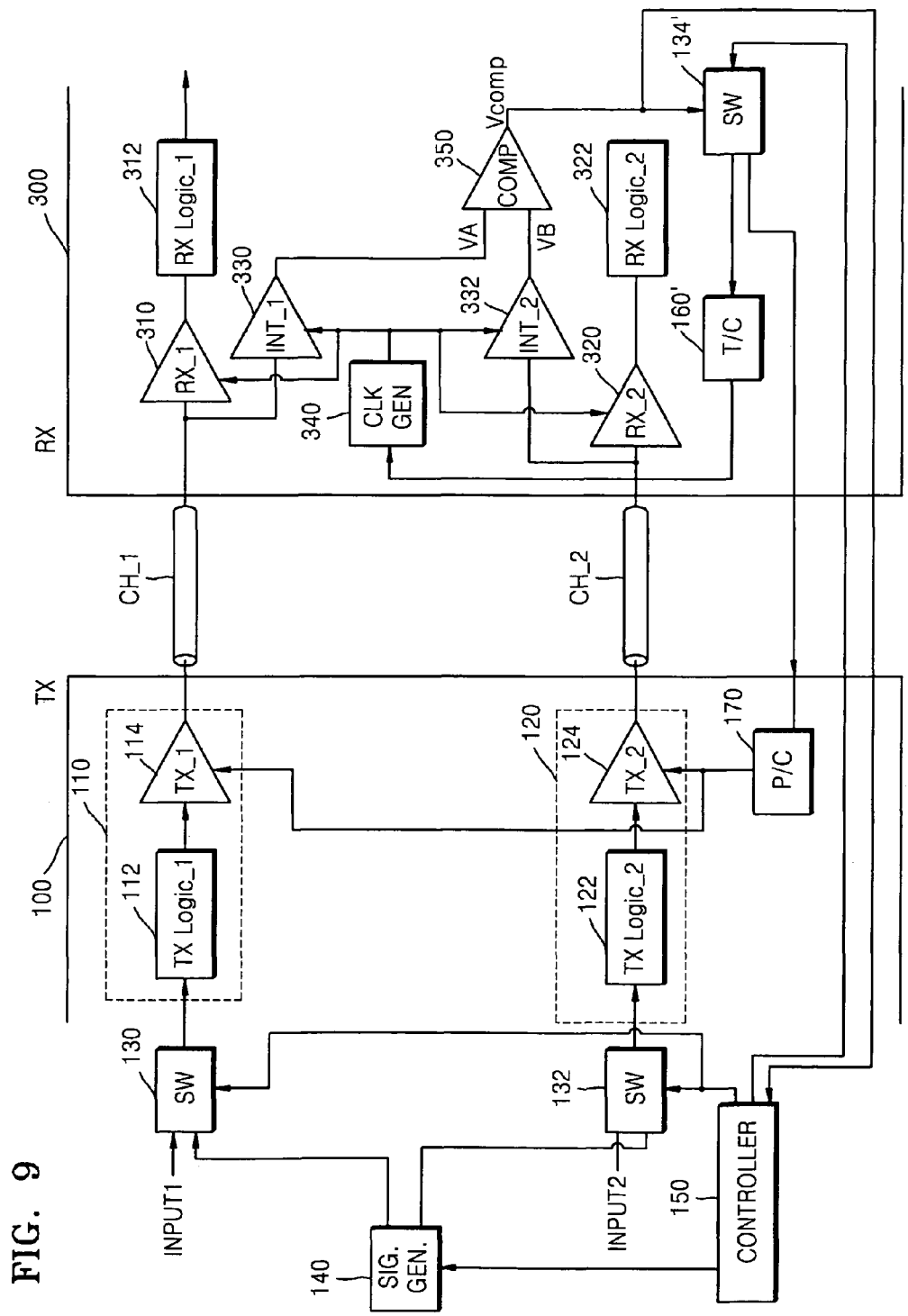
FIG. 9 illustrates a portion of a transceiver system according to another embodiment.
Figure 10:
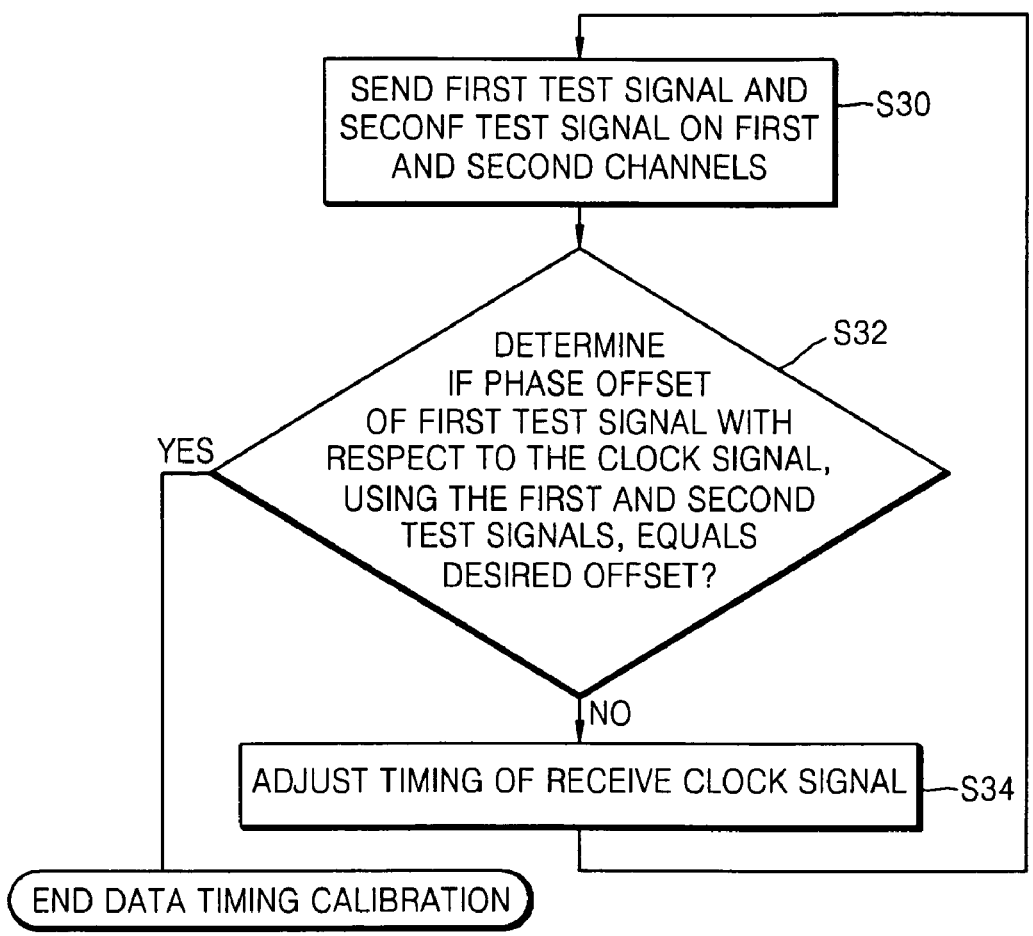
FIG. 10 illustrates a flow chart of the timing calibration process according to another embodiment.

FIG. 9 illustrates a portion of a transceiver system according to another embodiment. The embodiment of FIG. 9 is the same as the embodiment of FIG. 1 except that timing control has been moved from the transmitting system 100 to the receiving system 300. In particular, the output of the comparator 350 is supplied to a switch 134' in the receiving system 300, and the switch 134' selectively supplies the output of the comparator 350 to one of the pre-emphasis controller 170 in the transmitting system 100 and a timing controller 160' in the receiving system. Specifically, the timing calibration of step S10 in FIG. 2 is performed in accordance with the flow chart of FIG. 10.

As shown, in step S30, the controller 150 controls the signal generator 140 to generate first and second test bit streams TEST1 and TEST2, and controls the first and second switches 130 and 132 to supply the first and second test bit streams TEST1 and TEST2 to the first and second transmitters 110 and 120, respectively. In one embodiment, the first test bit stream TEST1 is "01100," and the second test bit stream TEST2 is "00110." Namely, the second test bit stream TEST2 has the same data pattern as the first test bit stream TEST1, but is phase shifted by a desired amount. Stated another way, the phase difference between the first and second test bit streams TEST1 and TEST2 is a desired amount. In one embodiment, the desired amount is one unit interval (UI), which is a time interval for one bit in the data processing system including the transceiver system of FIG. 9. Stated another way, and as discussed above, one UI is an interval of time that is associated with producing a minimum inter-symbol interference. The first transmitter 110 converts the first test bit stream into an analog first test signal, and transmits the first test signal over the first channel CH_1. The second transmitter 120 converts the second test bit stream into an analog second test signal, and transmits the second test signal over the second channel CH_2.

Next, in step S32, the controller 150 determines if the phase offset of the first test signal received at the receiving system 300 with respect to the clock signal rCLK at the receiving system 300 equals a desired offset. In one embodiment, the desired offset is one UI.

In particular, the first and second test signals are received and integrated by the first and second integrators 330 and 332, respectively. Also, as discussed above, the first and second integrators 330 and 332 perform the integration operation in accordance with the receive clock signal rCLK. The output VA of the first integrator 330 and the output VB of the second integrator 332 are supplied to a comparator 350, which compares VA and VB to produce a comparison result Vcomp. As will be appreciated, because the first and second test signals are integrated in accordance with the receive clock signal rCLK, and because the test signals have an intended phase offset of one UI, if the received first and second test signals have the intended phase offset of one UI, then VA will equal VB. Accordingly, if VA equals VB, this confirms that the received first test signal has the desired one UI phase offset with respect to the receive clock signal rCLK.

The controller 150 controls the switch 134' to supply the output of the comparator 350 to the timing controller 160'. The timing controller 160' controls the timing of the receive clock signal rCLK in response to the output of the comparator 350. If the received first test signal leads the received second test signal as in FIG. 4A, the timing controller 160' in step S34 increases the period of the receive clock rCLK. If the received first test signal lags the received second test signal as in FIG. 4B, the timing controller 160' in step S34 reduces the period of the receive clock signal rCLK. If the received first test signal is offset by the desired time interval from the received second test signal, the timing controller 160' does not adjust timing of the receive clock and the controller 150 determines that timing calibration is complete.

During pre-emphasis control, the controller 150 controls the switch 134' to send the output of the comparator 350 to the pre-emphasis controller 170, and pre-emphasis control is carried out in the same manner as described above with respect to FIGS. 1 and 2.

Figure 11:
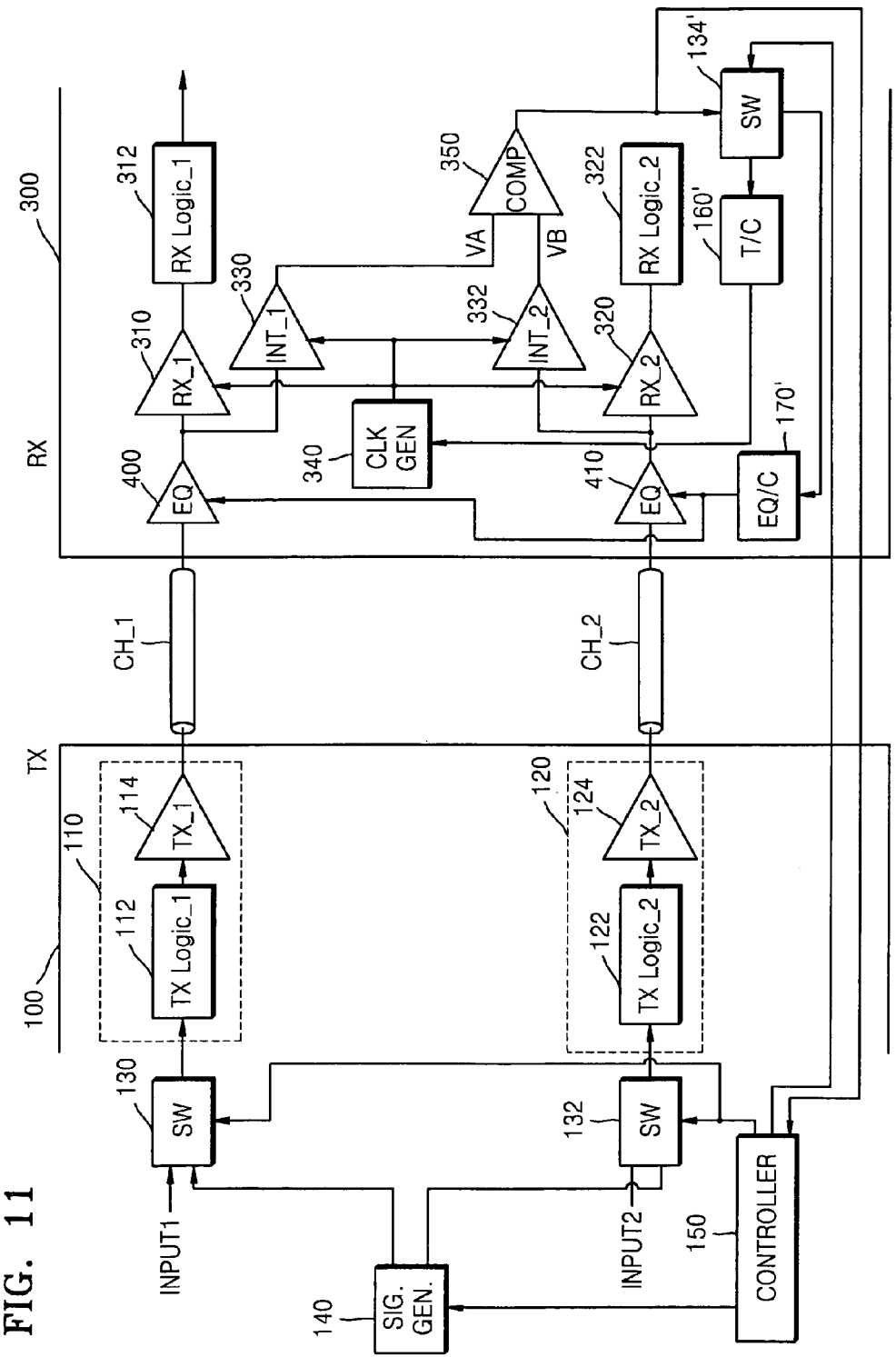
FIG. 11 illustrates a portion of a transceiver system according to another embodiment.

FIG. 11 illustrates a portion of transceiver system according to a further embodiment. The transceiver system of FIG. 11 is similar to the transceiver system of FIG. 1, and like components will have like reference numerals. However, the transceiver system of FIG. 11 will be described in full.

As will be described in more detail below, the transceiver system may operate as an interface between two devices. As shown in FIG. 11, the transceiver system includes a transmitting system 100 and a receiving system 300 communicating over a number of channels. In the embodiment of FIG. 11, only two channels CH_1 and CH_2 are shown, but it will be understood that the transceiver system may include more or less than two channels. The channels may be transmission lines, conductive lines, fiber optic lines, portions thereof, etc.

The transmitting system 100 includes a transmitter for each channel; accordingly, in this embodiment, the transmitting system 100 includes a first transmitter 110 and a second transmitter 120 transmitting over the first and second channels CH_1 and CH_2, respectively. The first transmitter 110 includes a first transmission logic 112, which processes received data for transmission (e.g., converts digital input to an analog signal), and a first driver 114, which transmits the data over the first channel CH_1. The second transmitter 120 includes a second transmission logic 122, which processes received data for transmission (e.g., converts digital input to an analog signal), and a second driver 124, which transmits the data over the first channel CH_2. Unlike the embodiment of FIG. 1, the drivers 114 and 124, in this embodiment, do not include pre-emphasis circuitry or have the pre-emphasis circuitry disabled. Because transmission logic and drivers are well-known elements, these elements and their operation will not be described in detail.

A first switch 130 supplies one of first data INPUT1 for transmission and a first test bit stream TEST1 to the first transmitter 110. A second switch 132 supplies one of second data INPUT2 for transmission and a second test bit stream TEST2 to the second transmitter 120. A signal generator 140 generates the first and second test bit streams TEST1 and TEST2. A controller 150 controls operation of the signal generator 140, and the first and second switches 130 and 132.

As shown in FIG. 11, the controller 150 also controls operation of a third switch 134' in the receiving system 300, which is described in detail below.

Operation of the transmitting system 100 will be described in detail below after the structural description of the receiving system 300.

The receiving system 300 includes an equalizer, a receiver and receiving logic for each channel. Accordingly, in this embodiment, the receiving system 300 includes a first equalizer 400 receiving and equalizing transmission over the first channel CH_1. A first receiver 310 receives output from the first equalizer 400. Similarly, a second equalizer 410 receives and equalizes transmission over the second channel CH_2, and a second receiver 320 receives output from the second equalizer 410. The first and second equalizers 400 and 410 may be a FFE or a DFE type. A first receiving logic 312 processes the output of the first receiver 310 (e.g., converts the received analog signal to digital), and a second receiving logic 322 processes the output of the second receiver 320 (e.g., converts the received analog signal to digital).

The receiving system 300 also includes a first integrator 330 receiving and integrating the transmission on the first channel CH_1, and the receiving system 300 includes a second integrator 332 receiving and integrating the transmission on the second channel CH_2. The first and second receivers 310 and 312, and the first and second integrators 330 and 332, operate (e.g., sample) based on a receive clock signal received from a clock generator 340. In one embodiment, the first and second integrators 330 and 332 integrate the received first and second test signals rTEST1 and rTEST2 over one half of the clock period. During the other half period, the first and second integrators 330 and 332 undergo an equalization operation.

A comparator 350 receives the output from both the first and second integrators 330 and 332, and generates a comparison result. This comparison result is feed back to the controller 150, and is also supplied to a third switch 134'.

The third switch 134' supplies the comparison result to one of a timing controller 160' and an equalization controller 170'. The timing controller 160' controls timing of the receive clock signal rCLK generated by the clock generator 340. The equalization controller 170' may be any well-known equalization controller (e.g., combination of a counter and finite state machine) for controlling the equalization performed by the first and second equalizers 400 and 410.

Figure 12:
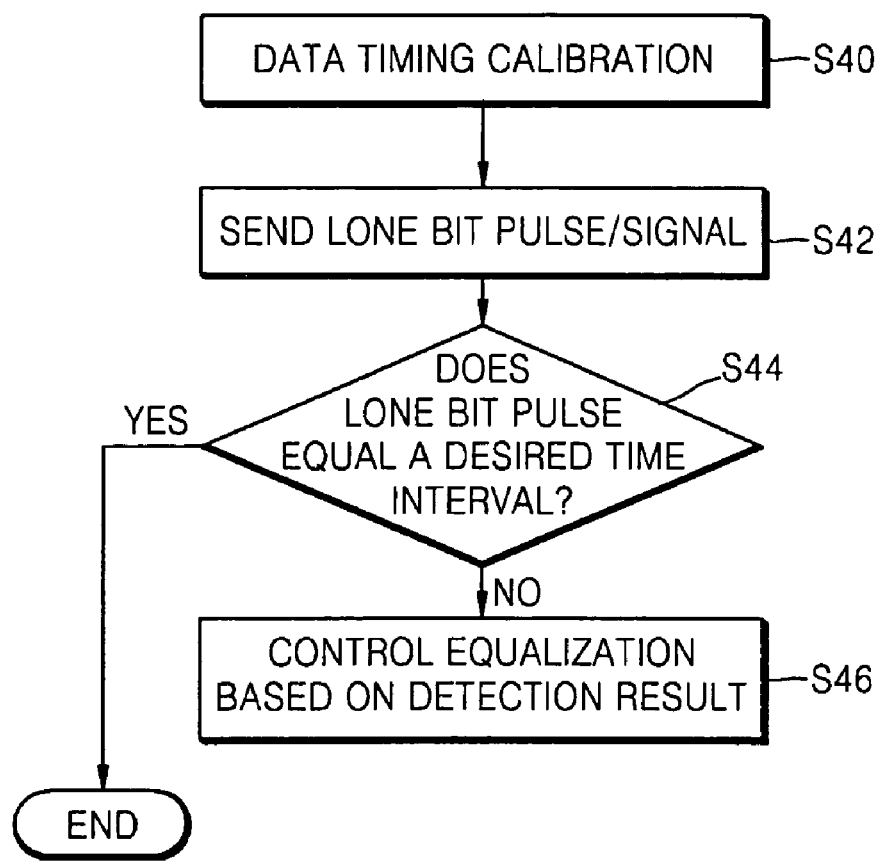
FIG. 12 illustrates a flow chart of timing and equalization calibration according to one embodiment.

Operation of the receiving system 300 and the transmitting system 100 will now be described in detail below. Before normal operation proceeds, a timing and equalization calibration between the transmitting and receiving systems 100 and 300 takes place. FIG. 12 illustrates a flow chart of the timing and equalization calibration according to one embodiment.

As shown, in step S40, a data timing calibration process is carried out. The timing calibration process of step S40 is the same as the timing calibration process described above with respect to FIG. 10. Accordingly, a description of this process will not be repeated.

After the timing calibration process, the controller 150 begins the equalization calibration process of steps S42-S46. In step S42, the controller 150 controls the signal generator 140 to generate a lone bit pulse as the first test bit stream TEST1 and to generate an alternating bit stream as the second test bit stream TEST2. For example, in one embodiment, the first test bit stream TEST1 is "00100," and the second test bit stream TEST2 is "10101." Accordingly, in step S42, the first transmitter 110 sends a lone bit pulse signal over the first channel CH_1, and the second transmitter 120 sends an alternating bit stream signal over the second channel CH_2.

Next, the controller 150 determines if the lone bit pulse in the lone bit pulse signal received by the receiving system 300 equals a desired time interval; namely, does the pulse width of the lone bit pulse equal the desired time interval. In one embodiment, the desired time interval is one UI.

In particular, the first and second test signals are received and integrated by the first and second integrators 330 and 332, respectively. Also, as discussed above, the first and second integrators 330 and 332 perform the integration operation in accordance with the receive clock signal rCLK. In particular, the first and second integrators 330 and 332 integrate over one-half a period of the receive clock signal rCLK. The output VA of the first integrator 330 and the output VB of the second integrator 332 are supplied to a comparator 350, which compares VA and VB to produce a comparison result Vcomp. As will be appreciated from the discussion above, the second test signal represents a signal having minimum inter-symbol-interference. Accordingly, the voltage VB will equal zero and if VA equals VB, this confirms that the received lone bit pulse in the first test signal equals the desired time interval of one UI. Stated another way, if VA equals VB, this confirms that the pulse width of the lone bit pulse in the received first test signal is equal to a pulse width producing minimal ISI.

Because VB will equal zero, it will also be appreciated that this and other embodiments may be modified to supply a zero reference voltage to the comparator 350 as VB instead of supplying the output of the second integrator 332.

If the lone bit pulse in the received first test signal rTEST1 is less than one UI as shown in FIG. 5A, then VA is less than VB, and the comparator 350 generates a comparison result Vcomp indicating VA<VB. During the equalization calibration, the controller 150 controls the third switch 134' to supply the feed back signal Vcomp to the equalization controller 170'. In the case of FIG. 5A, the feed back signal Vcomp indicates to the equalization controller 170' that the lone bit pulse is less than one UI. As a result, the equalization controller 170' in step S46 controls the equalization of the first and/or second equalizers 400 and 410 in any well-known manner to increase equalization and enlarge the pulse width.

In the case of FIG. 5A, the controller 150 determines, from the feed back signal, that a pulse width of the lone bit pulse does not equal the desired time interval (e.g., one UI). As a result, the controller 150 causes the equalization calibration processes to repeat starting with step S42.

If the lone bit pulse in the received first test signal rTEST1 is greater than one UI as in FIG. 5B, then VA is greater than VB and the comparator 350 generates a comparison result Vcomp indicating VA>VB. In the case of FIG. 5B, the feed back signal Vcomp indicates to the equalization controller 170' that the lone bit pulse is greater than one UI. As a result, the equalization controller 170' in step S46 controls the first and/or second equalizers 400 and 410 in any well-known manner to decrease equalization and reduce the pulse width.

In the case of FIG. 5B, the controller 150 determines, from the feed back signal, that a pulse width of the lone bit pulse does not equal the desired time interval (e.g., one UI). As a result, the controller 150 causes the equalization calibration processes to repeat starting with step S42.

If the lone bit pulse in the received first test signal rTEST1 equals one UI as in FIG. 5C, then VA equals VB, and the comparator 350 generates a comparison result Vcomp indicating VA=VB. In the case of FIG. 5C, the feed back signal Vcomp indicates to the equalization controller 170' that the lone bit pulse equals one UI. As a result, the equalization controller 170' does not change equalization performed by the first and second equalizers 400 and 410.

In the case of FIG. 5C, the controller 150 determines, from the feed back signal, that a pulse width of the lone bit pulse equals the desired time interval (e.g., one UI). As a result, the controller 150 causes the equalization calibration processes to end.

By calibrating the equalization such that the lone bit pulse equals one UI, the equalization is optimized to achieve minimal inter-symbol interference.

Once the calibration operations of FIG. 12 are complete, normal operation may take place. The controller 150 disables the third switch 134' from sending feed back to the timing and equalization controllers 160' and 170' such that no further timing and pre-emphasis changes occur. Furthermore, the controller 150 controls the first and second switches 130 and 132 to output the input data INPUT1 and INPUT2 to the first and second transmitters 110 and 120, respectively, for transmission.

As will be appreciated from the above disclosure, the same alternatives and modifications discussed with respect to the embodiment of FIG. 1 are also applicable to the embodiment of FIG. 11.

Figure 13:
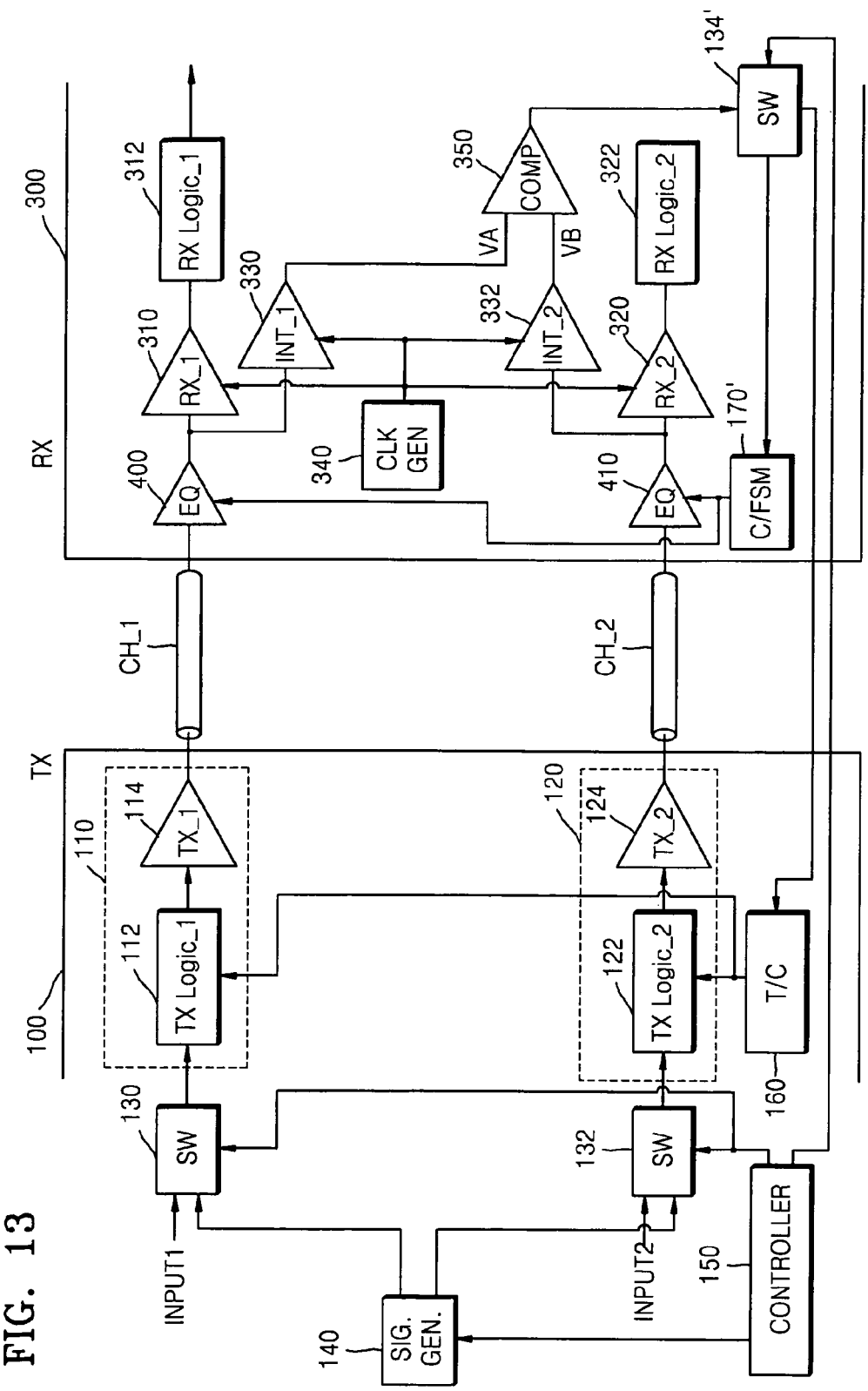
FIG. 13 illustrates a portion of a transceiver system according to another embodiment.

FIG. 13 illustrates a portion of a transceiver system in a data processing system according to another embodiment of the present invention. The embodiment of FIG. 13 is the same as the embodiment of FIG. 11 except that timing control has been moved from the receiving system 300 to the transmitting system 100. Namely, in this embodiment, timing calibration is the same as described with respect to FIGS. 1 and 3, while equalization calibration is the same as described with respect to FIGS. 11 and 12.

Figure 14:
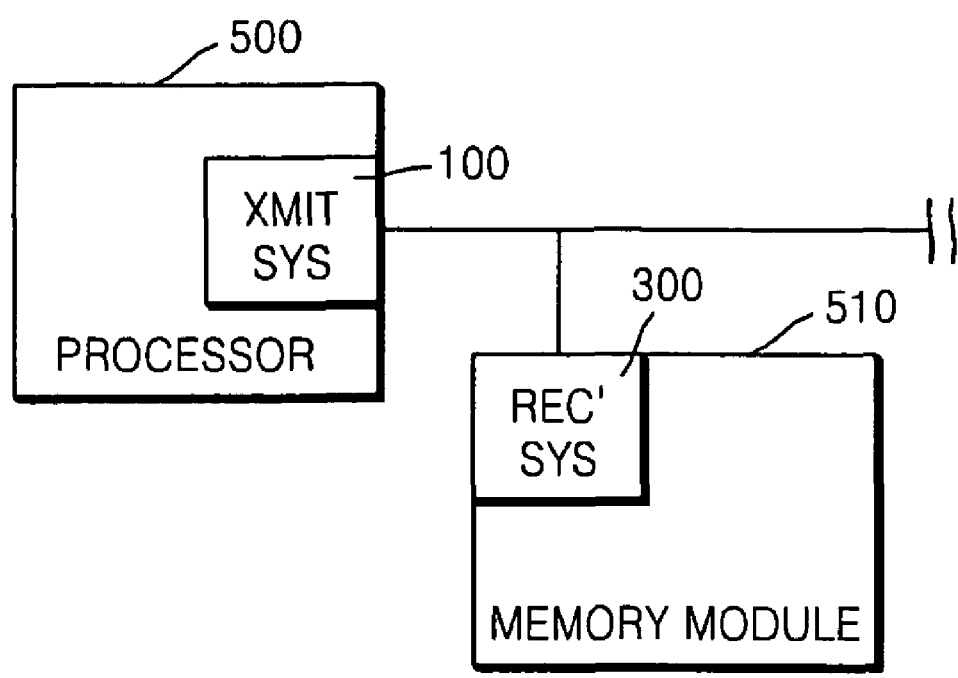
FIG. 14 illustrates a data processing system according to an embodiment of the present invention.

FIG. 14 illustrates data processing system according to an embodiment. As shown, the data processing system includes a processor (or controller) 500 connected by a bus 505 to at least one memory module 510. The processor 500 includes a transmitting system 100 and the memory module 510 includes a receiving system 300. The transmitting and receiving systems 100 and 300 may be embodied according to any of the above described embodiments. Accordingly, it will be understood that the bus 505 includes channels such as first and second channels CH_1 and CH_2 discussed in the above-described embodiments. Furthermore, for bi-directional communication, it will be understood that the memory module 510 may include a transmitting system 100 and the processor 500 may include a receiving system 300. The processor 500 may store date in the memory module 510 by transmitting the data over the bus 505 via the transmitting and receiving systems 100 and 300. Similarly, for bidirectional communication, the processor 500 may retrieve data from the memory module 510 over the bus 505 via a transmitting system 100 in the memory module 510 and a receiving system 300 in the processor 500. As will be appreciated, a plurality of memory modules 510 may be connected to the bus 505 and communicate with the processor 500 as described above.

The invention being thus described, it will be obvious that the same may be varied in many ways. Such variations are not to be regarded as a departure from the invention, and all such modifications are intended to be included within the scope of the invention.

I claim:

1. A method, comprising:
   receiving a lone bit signal, the lone bit signal having a plurality of bits and a single pulse among the plurality of bits;
   detecting whether a width of the pulse in the lone bit signal equals a desired time interval;
   outputting a detection signal indicating a result of the detecting.

2. The method of claim 1, wherein the desired time interval is an interval of time associated with one bit of a data processing system.

3. The method of claim 1, wherein the desired time interval is an interval of time associated with a minimum inter-symbol interference.

4. The method of claim 1, wherein the detecting comprises:
   integrating the lone bit signal over two times the desired time interval to generate a first integration output; and
   comparing the first integration output to an output representing integration of a signal with minimum inter-symbol interference; and
   generating the detection signal based on the comparison.

5. The method of claim 4, wherein the detecting comprises:
   integrating a received second test signal over two times the desired time interval to produce a second integration output, the second test signal representing a bit stream alternating between 1 s and 0 s; and wherein
   the comparing compares the first integration output and the second integration output.

6. The method of claim 1, wherein the detecting comprises:
   integrating the lone bit signal over one-half period of a clock signal to generate a first integration output; and
   comparing the first integration output to an output representing integration of a signal with minimum inter-symbol interference; and
   generating the detection signal based on the comparison.

7. The method of claim 6, wherein the detecting comprises:
   integrating a received second test signal over the one-half period of the clock to produce a second integration output, the second test signal representing a bit stream alternating between 1 s and 0 s; and wherein
   the comparing compares the first integration output and the second integration output.

8. The method of claim 7, prior to the detecting, comprising:
determining a phase offset of a received third test signal with respect to the clock signal; and
outputting a determination result.

9. The method of claim 8, further comprising:
selectively adjusting a phase of the clock signal based on the output determination result.

10. The method of claim 8, wherein the determining comprises:
integrating the third test signal over one-half period of the clock signal to produce a third integration result;
integrating a received fourth test signal over one-half period of the clock signal to produce a fourth integration result, the third and fourth signals representing a same data pattern with a different phase; and
comparing the third and fourth integration results to produce the determination result.

11. The method of claim 10, wherein the phase difference is the desired time interval.

12. The method of claim 11, wherein the desired time interval is an interval of time associated with one bit of a data processing system.

13. The method of claim 11, wherein the desired time interval is an interval of time associated with a minimum inter-symbol interference.

14. The method of claim 1, further comprising:
selectively adjusting equalization of received signals based on the detection signal.

15. The method of claim 14, wherein the equalization is increased if the detection signal indicates the width of the pulse is less than the desired interval.

16. The method of claim 14, wherein the equalization is decreased if the detection signal indicates the width of the pulse is greater than the desired time interval.

17. A method of timing calibration, comprising:
integrating a first test signal over one-half period a clock signal to produce a first integration result;
integrating a second test signal over the one-half period of the clock signal to produce a second integration result, the first and second signals representing a same data pattern with a different phase; and
producing a determination result indicating a phase offset of received signals with respect to the clock signal based on the first and second integration results.

18. The method of claim 17, wherein the one-half period of the clock signal equals 2 times a desired time interval.

19. The method of claim 18, wherein the desired time interval is an interval of time associated with one bit of a data processing system.

20. The method of claim 18, wherein the desired time interval is an interval of time associated with a minimum inter-symbol interference.

21. The method of claim 17, further comprising:
adjusting a timing of the clock signal based on the determination result.

22. A receiving system, comprising:
a receiver configured to receive a lone bit signal, the lone bit signal having a plurality of bits and a single pulse among the plurality of bits;
a first integrator configured to integrate the lone bit signal over half a period of a clock signal to produce a first integration result; and
a comparator configured to compare the first integration result to a value representing a desired integration result to produce a determination result indicating whether a pulse width of the single pulse equals a desired time interval.

23. A receiving system, comprising:
a first receiver configured to receive a first test signal;
a second receiver configured to receive a second test signal, the first and second test signals representing a same data pattern with a different phase;
a first integrator configured to integrate the first test signal over one-half period of a clock signal to produce a first integration result;
a second integrator configured to integrate the second test signal over the one-half period of the clock signal to produce a second integration result; and
a comparator configured to compare the first and second integration results to produce a determination result indicating a phase offset of received signals with respect to the clock signal.

* * * * *